United States Patent [19]

Olszewski et al.

[11] 4,138,193

[45] Feb. 6, 1979

[54] MULTIPLE FIBER LAMINATE FOR OPTICAL WAVEGUIDES

[75] Inventors: Jerzy A. Olszewski, Edison; Arnab Sarkar, Piscataway, both of N.J.

[73] Assignee: General Cable Corporation, Greenwich, Conn.

[21] Appl. No.: 837,015

[22] Filed: Sep. 27, 1977

[51] Int. Cl.² .................................................. G02B 5/16
[52] U.S. Cl. .............................. 350/96.23; 174/117 F; 350/96.24
[58] Field of Search ............. 350/96.23, 96.24, 96.25; 174/72 TR, 117 F

[56] References Cited

U.S. PATENT DOCUMENTS

| | | | |
|---|---|---|---|
| 3,544,192 | 12/1970 | Goldstein | 350/96.24 |
| 3,883,218 | 5/1975 | Slaughter | 350/96.23 |
| 4,054,365 | 10/1977 | Marx et al. | 350/96.23 |

FOREIGN PATENT DOCUMENTS 2319912  2/1977  France ......................... 350/96.23

*Primary Examiner*—Paul A. Sacher
*Assistant Examiner*—Stewart J. Levy
*Attorney, Agent, or Firm*—Roy C. Hopgood; John M. Calimafde; Charles W. Neill

[57] ABSTRACT

The application of low loss optical fibers in optical communication systems requires that the glass fibers are suitably packaged into a cable. This invention provides a system of multiple optical fibers between two tapes or films, one of which holds the fibers on the film by pressure-sensitive adhesive and in spaced relation to one another. The fibers are covered by a second film, preferably thinner than the first film, and secured to the first film along the edges of the films to provide a laminated structure suitable for cabling. Spacers between the films eliminate asymmetric pressure of the covering film against the optical fibers which are nearest to the edges of the films; and the spacers are preferably strength members for stiffening the laminate.

8 Claims, 2 Drawing Figures

MULTIPLE FIBER LAMINATE FOR OPTICAL WAVEGUIDES

BACKGROUND AND SUMMARY OF THE INVENTION

Patents which are pertinent to the subject matter of this invention are as follows: U.S. Pat. Nos. 3,883,218, (May 13, 1975); 3,984,172 (Oct. 5, 1975); 3,920,432 (Nov. 18, 1975); 3,937,559 (Feb. 10, 1976).

A property of glass optical fibers that makes cabling them difficult is that glass fibers are very small and their axes can be easily distorted sharply, by asymmetric forces of very small magnitude which in turn causes increase in attenuation. Almost all surfaces of cable components, including plastic buffering on fibers, are imperfect; therefore, in the presence of necessary forces required for cabling in long lengths, control of attenuation of the fibers become extremely difficult in conventional cabling.

The primary advantage a sub-assembly can provide is that the multiple-fiber composite becomes stronger and can be considerably more rigid reducing the proneness to microdistortion of fiber axes and, therefore, improved control over fiber performance in the cable. The principal features required for such a sub-assembly are minimal increase in attenuation in forming the sub-assembly, and reduced proneness to microdistortion of fiber axes in the sub-assembly.

Other features that become important in such sub-assemblies, due to practical considerations, are mechanically strippability for ease of cable termination and splicing; small size; and ease of identification through color code.

The improved package provided by the present invention includes a laminate in which the optical fibers are held between two films with the optical fibers secured to one of the films by pressure sensitive adhesive which permits the fibers to be connected with the film without the use of adhesive which might affect the length, width and/or flatness of the films. The optical fibers are covered by a second film, with the second film preferably thinner than the first film and connected to the first film along the edges of the film. The invention provides spacers to eliminate assymetric pressure of the second film on the edge fibers as secured to the first film.

An integral feature of the construction is that it is assymetric in nature, that is, the fiber axes are away from the neutral axis of the assembly so that each fiber in the assembly is in minimum tension when cabled. One advantage derived from this is that it is possible to provide extra stiffness, for instance, without delamination forces being too high, in the assembly for reduced microbending during cabling.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
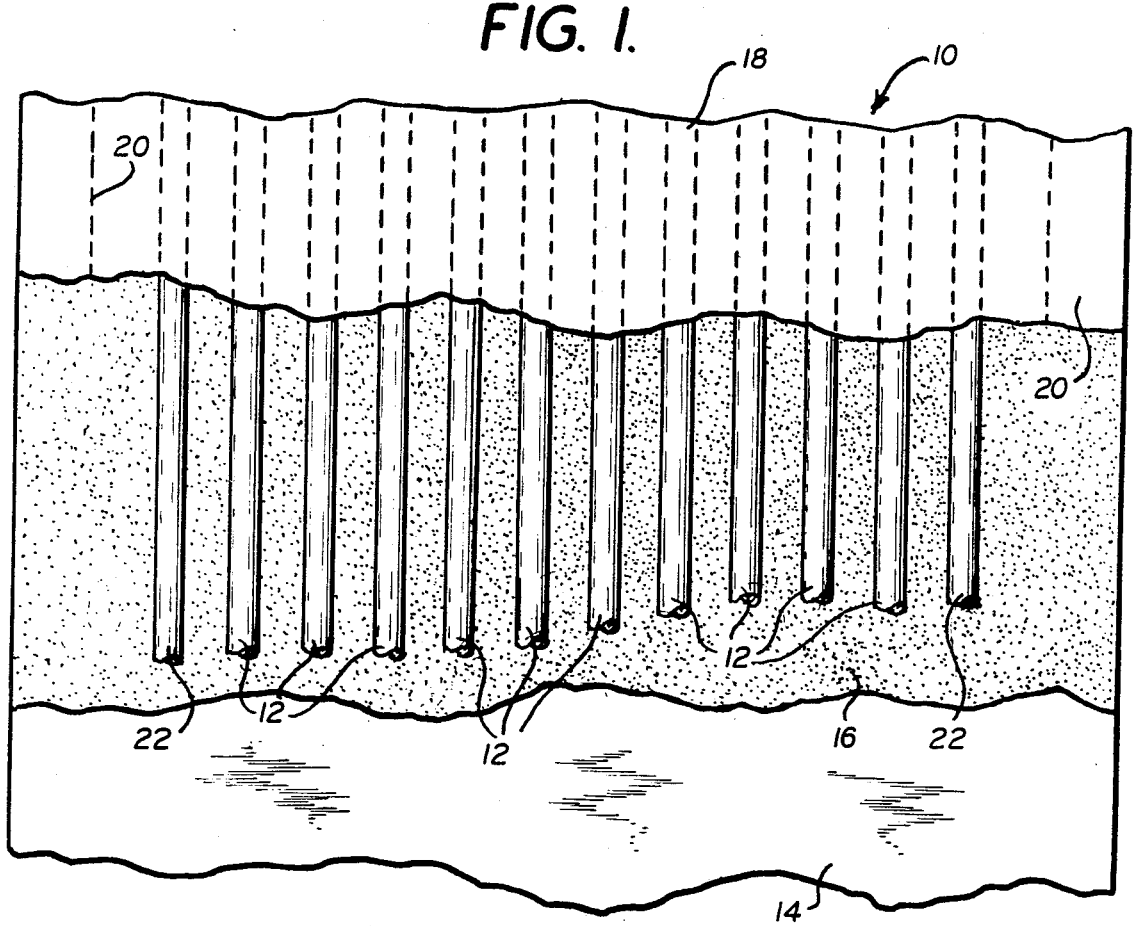
FIG. 1 is a top plan view with successive parts progressively broken away to show the construction of the laminate of this invention.
Figure 2:
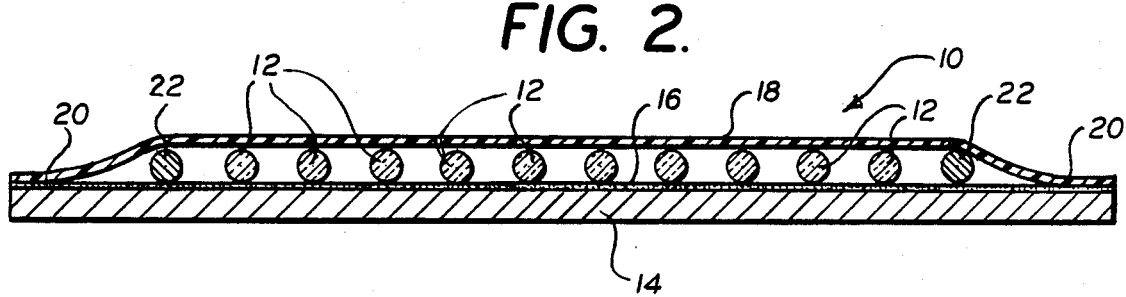
FIG. 2 is a sectional view taken on the line 2—2 of FIG. 1.

An optical fiber laminate 10 is formed by adhering optical fibers 12, having the conventional coating, to a strip 14 which is flexible and preferably made of polyester film or metal. In the preferred construction, each of the optical fibers 12 is adhered to the strip 14 by pressure-sensitive adhesive 16.

Pressure-sensitive adhesive 16 is preferably applied to the top surface of the strip or tape 14 as a continuous layer. The principal advantage of using a pressure-sensitive adhesive is that it avoids use of heat during the manufacture of the laminate and thus eliminates heat shrinkage of the tapes used for the laminate and the setting up of thermal induced stresses.

The film or tape 14 may be a 0.005" polyester (preferably preshrunk) film coated with a 0.003" thermosetting pressure-sensitive adhesive. A suitable polyester is polyethylene terephthalate (DuPont "Mylar" film).

The strip or tape 14 can be made of metal. The advantage of metal is greater strength and lesser temperature coefficient of lineal expansion, resulting in lesser change of optical attenuation with temperature. Whether made of plastic or metal, the strip or tape 14 should be so selected that it provides adequate stiffness but does not create a force of a magnitude which can cause delamination of the structure. The substrate tape 14 may be preshaped in a desired curvature prior or after lamination of the structure, for wrapping helically around a central member without causing undue stresses in the laminated structure. This is advantageous to facilitate manufacturing small diameter cables.

There is a covering tape or strip 18 overlying the optical fibers 12. This covering tape 18 may be in light contact with the upper portions of the optical fibers 12 and may be adhered to the optical fibers, but this is unnecessary because the purpose of the covering tape 18 is to give the laminate a continuous top surface which protects the optical fibers from contact with foreign objects when the laminate is being handled.

The covering tape 18 is preferably considerably thinner than the tape 14 and is preferably made of polyester of approximately 0.001" in thickness. The edge portions of the covering tape 18 are adhered to the lower tape 14 along the corresponding edges of the tapes, as indicated at the locations 20.

In the illustrated construction, it is necessary to provide suitable spacers 22 to eliminate asymmetric pressure of the covering strip or tape 18 on the optic fibers 12 which are the optic fibers nearest to the edges of the strip 14. It is a feature of the construction that the laminate is asymmetric in nature; that is, the fiber axis is away from the neutral axis of the assembly so that the fibers in the assembly, when cabled, are in tension of minimal magnitude. An advantage derived from this feature is that it is possible to provide extra stiffness, without delamination forces being too high, in the assembly for reduced microbending of the optical fibers during cabling.

A modification of the preferred construction can be made by having the lamination of symmetric construction with both of the films or tapes 14 and 18 of the same, or substantially the same, thickness and with one or both films coated with the pressure-sensitive adhesive so that minimized stresses on the fibers occur.

The spacers 22 may be made of glass, strong plastic or metal so as to serve as strength members for the laminate to prevent lengthwise stretching of the laminate which might exceed the elongation which the optical fibers can undergo without risk of breaking. This function of adding strength against longitudinal stretching of the laminate is in addition to the function of the spacers 22 in eliminating asymmetrical pressure on the optical fibers closest to the edges of the laminate. Such asymmetric loading of the edge fibers would cause high attenuation of those fibers.

With a flat strip 14, the optical fibers 12 extend generally parallel to one another and at substantially equal spacing across the width of the laminate; and they are held in this relationship on the tape 14 which provides sufficient stiffness to eliminate any abrupt changes in the direction of extent of any of the optical fibers which would be so sharp as to result in drastic attentuation of light signals transmitted by the various optical fibers.

The pressure-sensitive adhesive 16 obtains a bond of the optical fibers 12 to the strip 14, and of the edges of the covering strip 18 to the lower strip 14, which is strong enough to prevent delamination of the laminated structure when subjected to the bending stresses encountered in cabling the optical fibers.

The invention has been illustrated and described but changes and modifications can be made and some features can be used in different combinations without departing from the invention as defined in the claims.

What is claimed is:

1. An optical fiber laminate including in combination a first tape, a pressure sensitive adhesive on one of the broad surfaces of the tape, an optic fiber adhered to the tape by the pressure sensitive adhesive, a covering tape overlying the optic fiber and secured to the first tape along the edges of the tapes, and elongated elements on the first tape between the optic fiber and both edges of the tapes and holding the covering tape out of contact with the sides of the optic fiber so as to avoid assymetric pressure of the covering tape on the optic fiber.

2. The optical fiber laminate described in claim 1 characterized by a plurality of optical fibers on the first tape spaced from one another and with the optical fibers nearest to the edges of the tapes protected from assymetric pressure by the elongated elements supporting the covering tape.

3. The optical fiber laminate described in claim 2 characterized by the optic fibers being in parallel relation to one another when the laminate is flat and the elongated elements being secured to one of the tapes and being strength members in the laminate with enough strength to prevent stretching of the tapes to a degree that might break the optical fibers.

4. The optical fiber laminate described in claim 2 characterized by the covering tape being substantially thinner than the first tape so that the laminate is assymetrical in nature.

5. The optical fiber laminate described in claim 3 characterized by both of the tapes being made of polyester material.

6. The optical fiber laminate described in claim 4 characterized by the first tape being a polyester, preshrunk film about 0.005" thick coated with a thermosetting pressure responsive adhesive layer about 0.003" thick, and the covering tape being a polyester, uncoated film secured to the first film along the edges of the first film.

7. The optical fiber laminate described in claim 1 characterized by both of the tapes being made of plastic material and the laminate being strong enough to withstand stretching beyond the elongation of the optical fiber that might break said fiber.

8. The optical fiber laminate described in claim 2 characterized by the axes of the fibers being away from the neutral axis of the laminate assembly so that the fibers in the assembly, when cabled, is in tension of minimum magnitude with no risk of fiber elongation to its elastic limit.

* * * * *